UNITED STATES PATENT OFFICE 2,485,271

PREPARATION OF BIS-(2-CARBOXYALKYL) SULFONES

Marvin R. Frederick, Wadsworth, Ohio, assignor to The B. F. Goodrich Company, New York, N. Y., a corporation of New York No Drawing. Application September 25, 1948, Serial No. 51,310

8 Claims. (Cl. 260—537)

This invention relates to a method for preparing bis-(2-carboxy-alkyl) sulfones and is concerned particularly with the reaction of beta-lactones with water-soluble hyposulfites.

It is disclosed in U. S. Patent No. 2,356,459 to Frederick E. Küng that beta-lactones, that is, lactones or inner esters of beta-hydroxy carboxylic acids may be prepared in good yields by the reaction of a ketene with an aldehyde or ketone. In this manner, beta-propiolactone (also called hydracrylic acid lactone) which has the structure

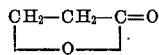

is economically obtained from ketene and formaldehyde.

It is further disclosed in a copending application, Serial No. 620,655, filed October 5, 1945, now Patent #2,449,987, that beta-propiolactone and other beta-lactones will react with ionizable inorganic salts in the presence of a polar solvent to give useful beta-substituted carboxylic acids. For example, common salt, sodium chloride, reacts with beta-propiolactone in aqueous solution to give, on acidification of the solution, beta-chloropropionic acid.

I have now discovered that beta-propiolactone and other saturated aliphatic beta-lactones will react with water-soluble hyposulfites in the presence of a polar solvent to yield a soluble complex (believed to be a salt of an acid of the formula

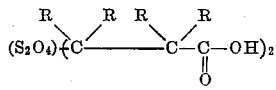

wherein each R is a member of the class consisting of hydrogen and alkyl) which upon acidification and heating gives off sulfur dioxide, there being obtained as a final product of the reaction a bis-(2-carboxyalkyl) sulfone. This reaction provides a convenient and economical method for preparing useful sulfones, many of which have heretofore been obtained only with difficulty and/or from relatively costly raw materials.

Since ionizable inorganic salts such as hyposulfites do not ordinarily react with organic compounds in which the atoms are bound together by the sharing of electrons (beta-lactones being representative of this type of organic compound), this reaction is unique in chemical synthesis. Its mechanism has not been established with certainty, but it is believed that the reaction proceeds (as illustrated in the case of sodium hyposulfite and beta-propiolactone) as follows, the lactone ring cleaving between the ring oxygen and the beta carbon atom:

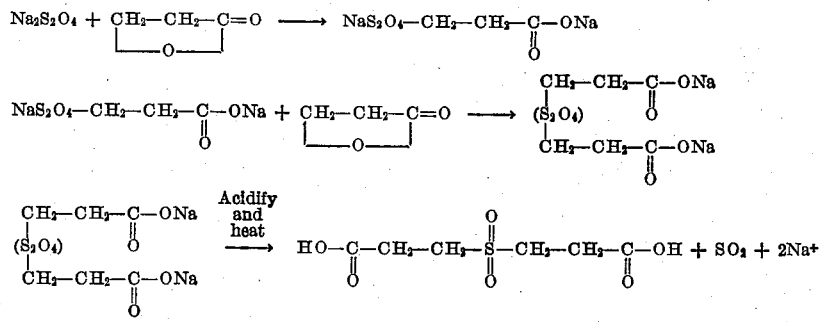

In carrying out the reaction illustrated by the above equations, it is desirable that a polar solvent be employed for the reactants, in order that the reactants may be brought into effective contact with one another, but no other special conditions are necessary. The polar solvent may be any solvent in which the hyposulfite will dissolve and ionize and which will also dissolve the beta-lactone. Water dissolves hyposulfites and many beta-lactones; hence the carrying out of the reaction in aqueous solution utilizing a water-soluble beta-lactone is by far the most convenient method of procedure, although with certain reactants the use of polar organic solvents such as alcohols, organic acids, nitro-paraffins, or the like may be desirable. Other conditions such as concentration of reactants and temperature of reaction are not critical factors and may be varied widely. While preferred conditions for specific reactions will be set forth in the examples hereinbelow, it may be said in general that the use of from 2 to 5 molecular proportions of beta-lactone to 1 molecular proportion of the hyposulfite (a ratio of 2 moles of the beta-lactone to 1 mole of the hyposulfite being stoichiometrically required for the reaction); and the use of temperatures of from −10° C. to 50° C. are most desirable.

One preferred method of carrying out the reaction consists in placing a water solution of the hyposulfite (preferably a freshly prepared solution since hyposulfite solutions tend to be somewhat unstable) in a reaction vessel fitted with a reflux condenser, stirrer and suitable cooling means for controlling the temperature of the reaction. The beta-lactone is then added to the hyposulfite solution, which is maintained at the desired reaction temperature, at a rate of from 0.33 to 1 mole of lactone per hour after which the reaction mixture is acidified and heated, preferably to boiling, for approximately an hour. Upon cooling of the solution, the bis-(2-carboxyalkyl)-sulfone crystallizes and can be separated from unreacted materials and the polar solvent simply by filtering. The product may be obtained in a more pure form after recrystallization from glacial acetic acid or other solvent.

It is to be understood that the preferred procedure outlined above is not the only means of effecting the reaction of this invention, for any conventional reaction procedure, including reverse order addition of the reactants, may be adopted without seriously affecting the yield of the sulfone obtained. Also, it has been found that if the beta-lactone is diluted with about 1 mole of acetone per mole of the beta-lactone, higher yields of the sulfone are obtained, the addition of the beta-lactone to the hyposulfite solution is more easily controlled, and the slight tendency for the beta-lactone to react with itself is greatly decreased. Moreover, the product may be obtained by heating the acidified solution to temperatures below boiling, for example from 35° to 100° C., although a longer time (in the neighborhood of 10 to 20 hours) at the lowest temperature is required.

As disclosed hereinabove, any water-soluble hyposulfite may be utilized in the reaction of this invention. Because they are water-soluble and exist in a relatively stable form, the hyposulfites of the elements of group I of the periodic table, especially sodium hyposulfite, potassium hyposulfite and lithium hyposulfite and hyposulfites of the elements of group II of the periodic table, especially calcium hyposulfite, magnesium hyposulfite, zinc hyposulfite and strontium hyposulfite are preferably employed in the reaction with beta-lactones, although other water-soluble hyposulfites such as iron hyposulfite may also be used so long as they are obtained in a sufficiently stable form. In this connection it has been found that the hyposulfites may be stabilized somewhat by the addition of a small portion of the hydroxide having the same anion as the hyposulfite. Thus, for example, sodium hydroxide tends to increase the stability of sodium hyposulfite.

Beta-propiolactone, the simplest possible beta-propiolactone, is preferably used in the reaction of this invention because of its low cost and the ease with which it reacts with hyposulfites. However, the homologs of beta-propiolactone, that is, other saturated aliphatic beta-lactones such as beta-butyrolactone, beta-isobutyrolactone, beta-valerolactone, beta-isovalerolactone, beta-n-caprolactone, alpha-ethyl-beta-propiolactone, alpha-isopropyl-beta-propiolactone, alpha-butyl-beta-propiolactone, alpha-methyl-beta-butyrolactone, alpha-ethyl-beta-butyrolactone, beta-methyl-beta-valerolactone and the like may also be used advantageously.

The following specific examples, in which all parts are by weight, illustrate the reaction of hyposulfites with beta-lactones to obtain bis-(2-carboxyalkyl) sulfones. However, the examples are not intended to be a limitation on the invention, for there are, of course, numerous possible variations and modifications in the reaction procedure as set forth hereinbelow.

*Example I*

193 parts (1 mole) of 90% sodium hyposulfite are mixed with 400 parts of water in a reaction vessel equipped with a stirrer, a reflux condenser and temperature measuring means. The solution is then cooled to a temperature of 25° C. and 144 parts (2 moles) of beta-propiolactone are slowly added over a period of two hours, after which most of the product is in solution with a minor part in suspension. The solution is next acidified with 292 parts of concentrated hydrochloric acid and boiled for 30 minutes. Upon cooling of the solution, the product crystallizes. The solid crystals are then removed from the solution by filtering and are washed with water. A 57% yield of substantially pure bis-(2-carboxyethyl)-sulfone (M. P. 215°–217° C.) is obtained after recrystallization from glacial acetic acid.

*Example II*

Example I is repeated except that the beta-propiolactone is diluted with 118.5 parts of acetone before the lactone is added to the hyposulfite solution and the temperature is maintained at from 10°–15° C. A 75% yield of bis-(2-carboxyethyl)-sulfone (M. P. 215–217° C.) is obtained.

*Example III*

Example I is repeated except that 800 parts of water are mixed with the sodium hyposulfite. Upon acidification and heating of the reaction mixture, a 32% yield of bis-(2-carboxyethyl) sulfone is obtained.

*Example IV*

228 parts (1 mole) of 85% zinc hyposulfite are mixed with 500 parts of water in a reaction vessel placed in a cooling bath and fitted with a reflux condenser and stirrer. The solution is next cooled to 15° C. and 144 parts (2 moles) of beta-propiolactone are added slowly, the temperature of the reaction mixture being maintained between 15° C. and 35° C. during the addition of the lactone. The reaction mixture is then acidified with 300 parts of concentrated hydrochloric acid and heated to boiling for 60 minutes. Upon cooling, a crystalline product forms which is then removed from the reaction mixture by filtering and is identified as bis-(2-carboxyethyl) sulfone (M. P. 215°–217° C.).

*Example V*

Example IV is repeated except that 10 parts of solid sodium hydroxide are added to stabilize the hyposulfite solution. Bis-(2-carboxyethyl) sulfone is obtained in 63% yield.

When the above examples are repeated using other saturated aliphatic beta-lactones in place of beta-propiolactone, bis-(2-carboxyalkyl) sulfones are again obtained in substantial yield. For example, alpha-ethyl-beta-propiolactone reacts with an aqueous solution of a water-soluble hyposulfite such as zinc hyposulfite to yield bis-(2-carboxybutyl) sulfone, and beta-butyrolactone reacts with potassium hyposulfite in solution in a polar solvent to give bis-(1-methyl-2-carboxyethyl) sulfone. Similarly, bis-(2-carboxyalkyl) sulfones are also obtained when the reaction is carried out in other solvents such as alcohols, nitroparaffins and the like, and when other of the water-soluble hyposulfites mentioned above are employed.

The bis-(2-carboxyalkyl) sulfones obtained by the reaction of this invention are very useful compounds. For example, they are useful as stabilizers for polyvinyl chloride and the esters obtained by simple esterification of the sulfones are excellent plasticizers for use in preparing synthetic resin compositions, especially polyvinyl chloride compositions. The bis-(2-carboxyalkyl) sulfones are also useful as chemical intermediates in the preparation of valuable organic compounds as well as for many other uses.

Although specific embodiments of the invention have been described hereinabove, it is not intended that it be limited solely thereto, but only to the spirit and scope of the appended claims.

I claim:

1. The method of preparing a bis-(2-carboxyalkyl) sulfone which comprises bringing together a saturated aliphatic beta-lactone with a solution of a water-soluble hyposulfite in a polar solvent, whereby to form a solution of a salt of an acid of the formula

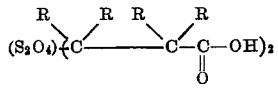

wherein R is a member of the class consisting of hydrogen and alkyl, acidifying the resulting solution, heating the resulting acidified solution, and recovering said bis-(2-carboxyalkyl) sulfone.

2. The method of preparing a bis-(2-carboxyalkyl) sulfone which comprises bringing together a saturated aliphatic beta-lactone with a solution of a water-soluble hyposulfite in a polar solvent, whereby to form a solution of a salt of an acid of the formula

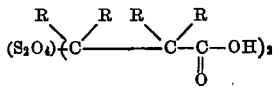

wherein R is a member of the class consisting of hydrogen and alkyl, at a temperature of from —10° C. to 35° C., acidifying the resulting solution, heating the resulting acidified solution, and recovering said bis-(2-carboxyalkyl) sulfone.

3. The method of preparing bis-(2-carboxyethyl) sulfone which comprises bringing together beta-propiolactone and a solution of a water-soluble hyposulfite in a polar solvent, at a temperature of —10° C. to 35° C., acidifying the resulting solution, heating the resulting acidified solution to boiling, and recovering said bis-(2-carboxyethyl) sulfone.

4. The method of preparing bis-(2-carboxyethyl) sulfone which comprises bringing together beta-propiolactone and an aqueous solution of a water-soluble hyposulfite at a temperature of from —10° C. to 35° C., whereby to form an aqueous solution of a salt of the acid of the formula

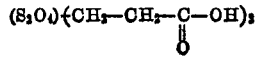

acidifying the resulting aqueous solution, heating the resulting acidified solution to boiling, and recovering said bis-(2-carboxyethyl) sulfone.

5. The method of preparing bis-(2-carboxyethyl) sulfone which comprises bringing together 2 moles of beta-propiolactone and an aqueous solution of 1 mole of an alkali metal hyposulfite at a temperature of —10° C. to 35° C., whereby to form an aqueous solution of an alkali metal salt of the acid of the formula

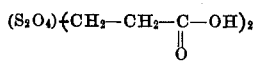

acidifying the resulting aqueous solution, heating the resulting acidified solution to boiling, and recovering said bis-(2-carboxyethyl) sulfone.

6. The method of preparing bis-(2-carboxyethyl) sulfone which comprises bringing together 2 moles of beta-propiolactone and an aqueous solution of 1 mole of sodium hyposulfite at a temperature of —10° C. to 35° C., whereby to form an aqueous solution of the sodium salt of the acid of the formula

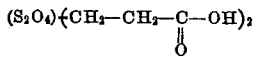

acidifying the resulting solution with concentrated hydrochloric acid, heating the resulting acidified solution to boiling, and recovering said bis-(2-carboxyethyl) sulfone.

7. The method of preparing bis-(2-carboxyethyl) sulfone which comprises bringing together 2 moles of beta-propiolactone containing about 1 mole of acetone with an aqueous solution of 1 mole of sodium hyposulfite at a temperature of from —10° C. to 35° C., whereby to form an aqueous solution of the sodium salt of the acid of the formula

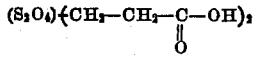

acidifying the resulting aqueous solution and heating the resulting acidified solution to boiling, and recovering said bis-(2-carboxyethyl) sulfone.

8. The method of preparing bis-(2-carboxyethyl) sulfone which comprises bringing together 2 moles of beta-propiolactone and an aqueous solution of 1 mole of zinc hyposulfite at a temperature of from —10° C. to 35° C., whereby to form an aqueous solution of the zinc salt of the acid of the formula

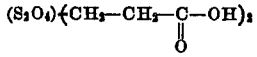

acidifying the resulting solution with concentrated hydrochloric acid, heating the resulting acidified solution to boiling, and recovering said bis-(2-carboxyethyl) sulfone.

MARVIN R. FREDERICK.

No references cited.